(12) United States Patent
Fukugawa et al.

(10) Patent No.: US 8,174,610 B2
(45) Date of Patent: May 8, 2012

(54) CAMERA

(75) Inventors: Kohei Fukugawa, Osaka (JP);
Kazuhiro Tsujino, Osaka (JP)

(73) Assignee: SANYO Electric Co., Ltd.,
Moriguchi-shi (JP)

( * ) Notice: Subject to any disclaimer, the term of this patent is extended or adjusted under 35 U.S.C. 154(b) by 983 days.

(21) Appl. No.: 12/137,774

(22) Filed: Jun. 12, 2008

(65) Prior Publication Data

US 2008/0316355 A1 Dec. 25, 2008

(30) Foreign Application Priority Data

Jun. 25, 2007 (JP) ................................. 2007-165736

(51) Int. Cl.
*H04N 5/238* (2006.01)
(52) U.S. Cl. ........................................ 348/365; 396/154
(58) Field of Classification Search .................. 348/364, 348/365; 396/154
See application file for complete search history.

(56) References Cited

U.S. PATENT DOCUMENTS

| 6,091,908 | A | 7/2000 | Fukuda |
| 2001/0017660 | A1 | 8/2001 | Kawanishi |
| 2005/0030415 | A1* | 2/2005 | Takizawa ...................... 348/362 |
| 2008/0158410 | A1* | 7/2008 | Lin ............................... 348/364 |
| 2008/0231730 | A1* | 9/2008 | Tsuruoka ................... 348/229.1 |

FOREIGN PATENT DOCUMENTS

| JP | 03-001771 | A | 1/1991 |
| JP | 05-43669 | U | 6/1993 |
| JP | 08-087053 | A | 4/1996 |
| JP | 08-101427 | A | 4/1996 |
| JP | 2000-004394 | A | 1/2000 |
| JP | 2001-242504 | A | 9/2001 |
| JP | 2002-300468 | A | 10/2002 |

* cited by examiner

*Primary Examiner* — W. B. Perkey
*Assistant Examiner* — Fang-Chi Chang
(74) *Attorney, Agent, or Firm* — Westerman, Hattori, Daniels & Adrian, LLP

(57) ABSTRACT

A camera includes an image sensor, and a plurality of metering areas are assigned to an object scene captured by the image sensor. A CPU evaluates a luminance of the object scene for each metering area, and binarizes each of the plurality of obtained luminance evaluated values. Furthermore, on the basis of the plurality of binarized luminance evaluated values, a width of a high luminance area included in the object scene is calculated while a width of an adjacent area adjacent to the high luminance area out of a low luminance area included in the object scene is calculated. Then, each of the plurality of luminance evaluated values is corrected on the basis of a ratio between the width of the calculated adjacent area and the width of the calculated high luminance area. An exposure amount to the image sensor is adjusted on the basis of the luminance evaluated values thus corrected.

6 Claims, 9 Drawing Sheets

(0= LOW LUMINANCE BLOCK,
1=HIGH LUMINANCE BLOCK)

(B)

R3

(A=ADJACENT BLOCK)

(0= LOW LUMINANCE BLOCK,
1=HIGH LUMINANCE BLOCK)

(B)

R3

(A=ADJACENT BLOCK)

CAMERA

CROSS REFERENCE OF RELATED APPLICATION

The disclosure of Japanese Patent Application No. 2007-165736 filed on Jun. 25, 2007 is incorporated herein by reference.

BACKGROUND OF THE INVENTION

1. Field of the Invention

The present invention relates to a camera. More specifically, the present invention relates to a camera performing a backlight correction.

2. Description of the Related Art

According to a related art, correction processing based on the difference in luminance between a center portion and a periphery portion of the object scene is executed. More specifically, by assign weights to a relatively dark center portion, luminance evaluated values are reduced. Thus, an amount of the exposure is adjusted in an increasing direction, so that it is possible to realize an appropriate exposure at the backlighted state.

However, in the related art like a shooting of sunshine filtering through foliage, in a state that a high luminance area is dispersed over an object scene (dispersed backlighted state), the difference in luminance between the center portion and the periphery portion is hardly detected, so that correction processing does not effectively work, causing a shortage of the amount of the exposure.

SUMMARY OF THE INVENTION

In one aspect of the present invention, a camera comprises an imager for capturing an object scene; an assigner for assigning a plurality of metering areas to the object scene; an evaluator for evaluating a luminance of the object scene for each metering area; a classifier for classifying the plurality of metering areas into a high luminance area representing a luminance higher than a first threshold value and a low luminance area representing a luminance lower than the first threshold value on the basis of a plurality of luminance evaluated values obtained by the evaluation processing by the evaluator; a detector for detecting a border between the high luminance area and the low luminance area which are included in the object scene on the basis of a positional relationship between the plurality of metering areas classified by the classifier; a corrector for correcting each of the plurality of luminance evaluated values obtained by the evaluation processing by the evaluator on the basis of a size of the border detected by the detector; and an adjuster for adjusting an amount of an exposure on the imager on the basis of the luminance evaluated values corrected by the corrector.

Objects and other objects, features, aspects and advantages of the present invention will become more apparent from the following detailed description of the present invention when taken in conjunction with the accompanying drawings.

BRIEF DESCRIPTION OF THE DRAWINGS

FIG. 4(A) is an illustrative view showing one example of binarized luminance evaluated values;

FIG. 4(B) is an illustrative view showing an adjacent block selected on the basis of the luminance evaluated values shown in FIG. 4(A);

FIG. 5(A) is an illustrative view showing another example of binarized luminance evaluated values;

FIG. 5(B) is an illustrative view showing an adjacent block selected on the basis of the luminance evaluated values shown in FIG. 5(A);

DETAILED DESCRIPTION OF THE PREFERRED EMBODIMENTS

Figure 1:
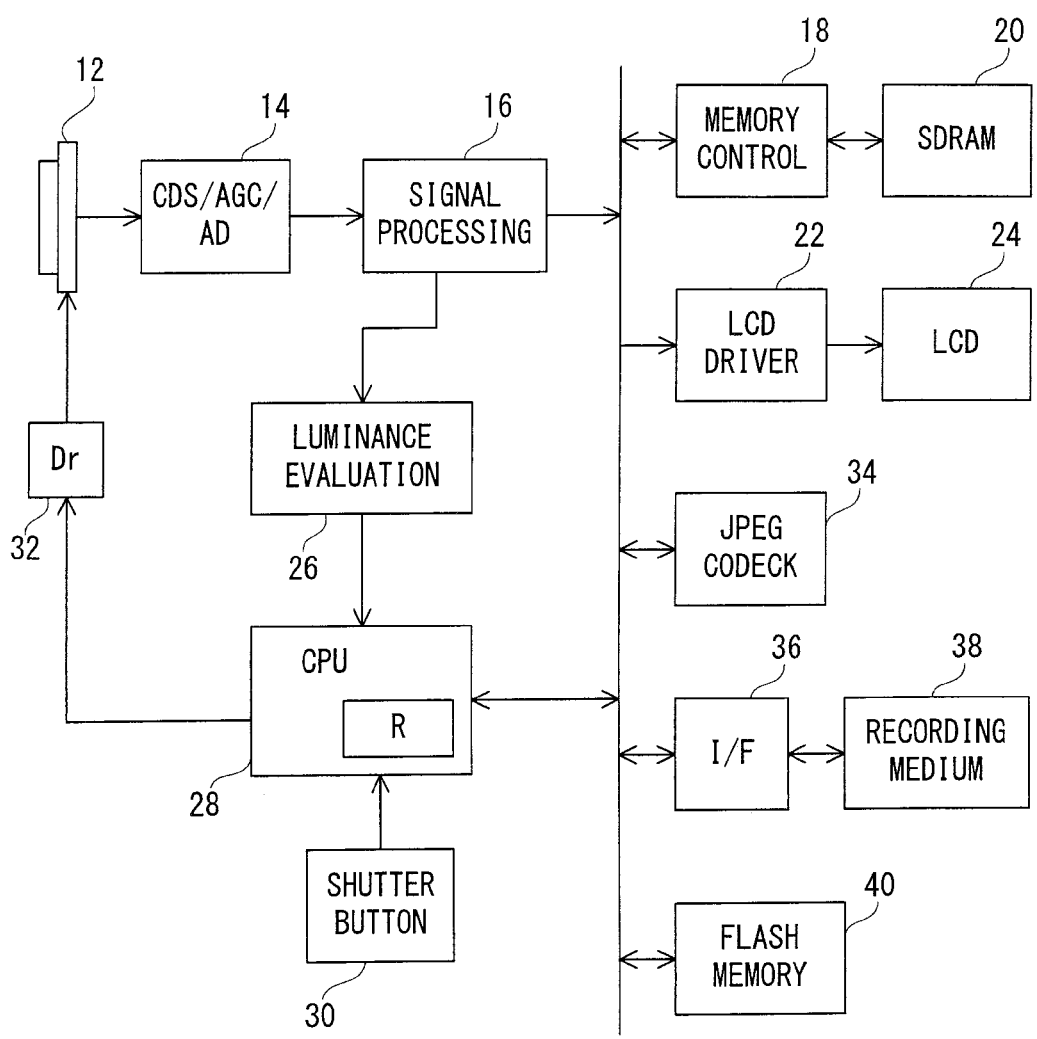
FIG. 1 is a block diagram showing a configuration of one embodiment of the present invention.

Referring to FIG. 1, a digital camera 10 of this embodiment includes an image sensor 12. An optical image of an object scene is irradiated onto an acceptance surface, that is, an imaging surface, of the image sensor 12, and from the imaging surface, electric charges corresponding to the optical image of the object, that is, a raw image signal is generated by a photoelectronic conversion.

When a real-time motion image, that is, a through-image of the object is displayed on an LCD monitor 24, a CPU 28 instructs a driver 32 to repetitively perform a pre-exposure and a thinning-out reading. The driver 32 repetitively executes a pre-exposure of the image sensor 12 and a thinning-out reading of a raw image signal thus generated. A low-resolution raw image signal corresponding to the optical image of the object is output from the image sensor 12.

The output raw image signal is subjected to a series of processing such as a noise removal, a level adjustment and an A/D conversion by a CDS/AGC/AD circuit 14, so that raw image data being a digital signal can be obtained. A signal processing circuit 16 performs processing such as a white balance adjustment, a color separation, a YUV conversion, etc. on the raw image data output from the CDS/AGC/AD circuit 14 to generate image data in a YUV format. The generated image data is written to an SDRAM 20 by a memory control circuit 18, and then read by the same memory control circuit 18.

An LCD driver 22 drives the LCD monitor 24 according to the image data read by the memory control circuit 18 to thereby display a through-image of the object on the monitor screen.

The Y data out of the image data generated by the signal processing circuit 16 is applied to a luminance evaluation circuit 26 for exposure control.

Figure 2:
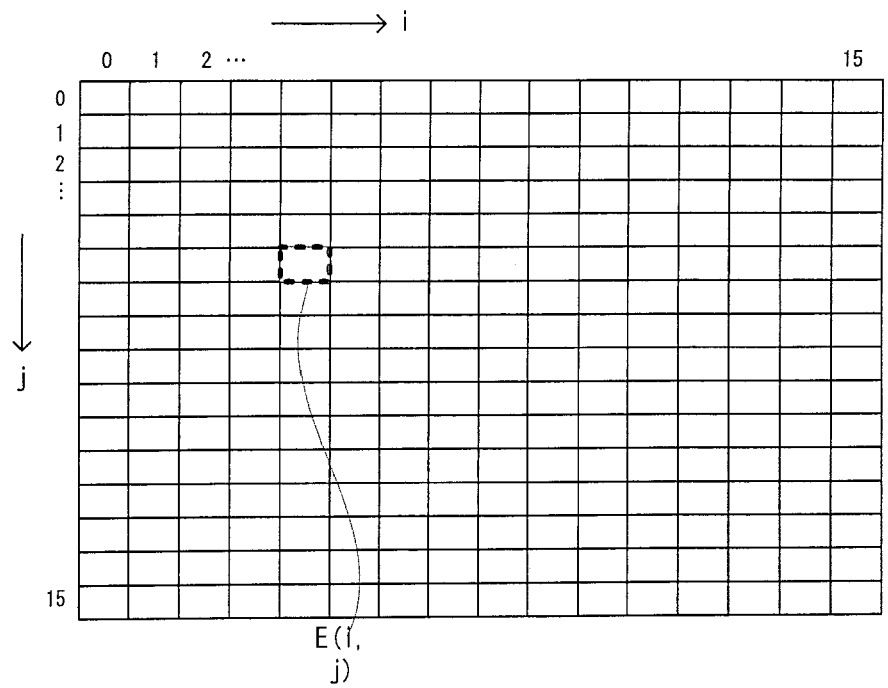
FIG. 2 is an illustrative view showing one example of metering areas applied to FIG. 1 embodiment.

Referring to FIG. 2, the luminance evaluation circuit 26 divides the object scene into 16 in a horizontal direction (i) and in a vertical direction (j), and as to these 16×16=256 divided areas, that is, E (0, 0)-E (15, 15), Y data is added up.

Thus, luminance evaluated values of 256, that is, Iy (0, 0)-Iy (15, 15) are output from the luminance evaluation circuit 26.

Figure 3:
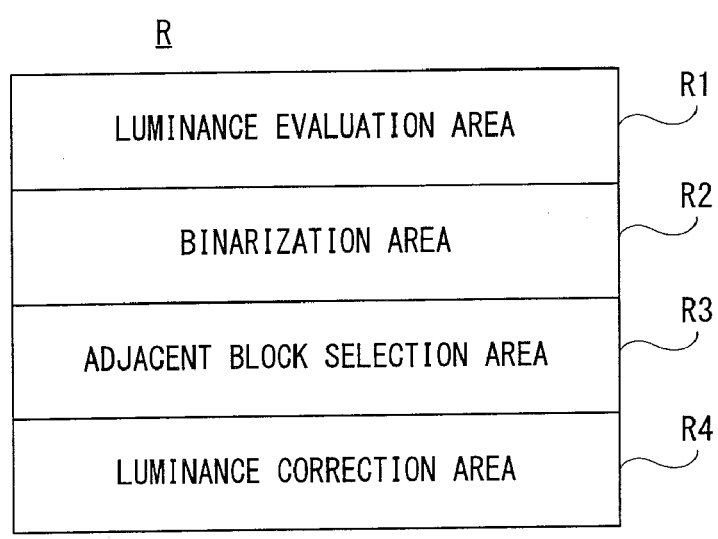
FIG. 3 is an illustrative view showing one example of a memory map of a memory for luminance evaluation applied to FIG. 1 embodiment.

Referring to FIG. 3, a memory for luminance evaluation R incorporated in the CPU 28 includes a luminance evaluation area R1, a binarization area R2, an adjacent block selection area R3 and a luminance correction area R4. Each of the areas R1-R4 is divided into blocks of 16×16=256 respectively corresponding to the divided areas of 16×16=256 in FIG. 2, and the luminance evaluated values of 256 output from the luminance evaluation circuit 26 are respectively stored in the blocks of 256. Here, the memory for luminance evaluation R may be externally added, or a flash memory 40 may be used as a substitute for it.

The CPU 28 adjusts a pre-exposure time set to the driver 32 on the basis of the data of the luminance evaluation area R1.

By the exposure control described above, brightness of the through-image output from the LCD monitor 24 is adjusted.

Referring to FIG. 1 again, when a shutter button 30 is half-depressed, the CPU 28 performs a backlight correction, and executes exposure adjusting processing based on the corrected luminance evaluated values.

In the backlight correction processing, the CPU 28 binarizes the data in the luminance evaluation area R1, that is, the luminance evaluated values of 256 with a threshold value (Th1), and writes the resultant to the binarization area R2 (see FIG. 4(A), FIG. 5(A): described later). Here, "0" indicates a low luminance, and "1" indicates a high luminance. The block to which "0" is stored is called a "low luminance block", and the block to which "1" is stored is called a "high luminance block".

The CPU 28 evaluates the number of high luminance blocks (m) on the basis of the data in the binarization area R2.

Furthermore, the CPU 28 selects a low luminance area (hereinafter, referred to as "adjacent area") adjacent to a high luminance area out of the divided area of 256 on the basis of the data in the binarization area R2. More specifically, whether "0" adjacent to "1" or not is determined as to each of the blocks of 256 within the binarization area R2, and the resultant is written to the adjacent block selection area R3 (see FIG. 4(B), FIG. 5(B): described later). Here, "0" adjacent to "1" is rewritten by "A". The block in which "A" is stored is called an "adjacent block".

Additionally, the CPU 28 evaluates the number of adjacent blocks (n) on the basis of the data in the adjacent block selection area R3.

In addition, the CPU 28 evaluates an average luminance value (a) of the object scene on the basis of the data in the luminance evaluation area R1.

Also, the CPU 28 evaluates a ratio of the number of adjacent blocks n to the number of high luminance blocks m, that is, n/m. Then, when n/m>1, that is, when the number of adjacent blocks is above the number of high luminance blocks, an upper limit (x) corresponding to the n/m is set as to each of the luminance evaluated values.

Figure 10:
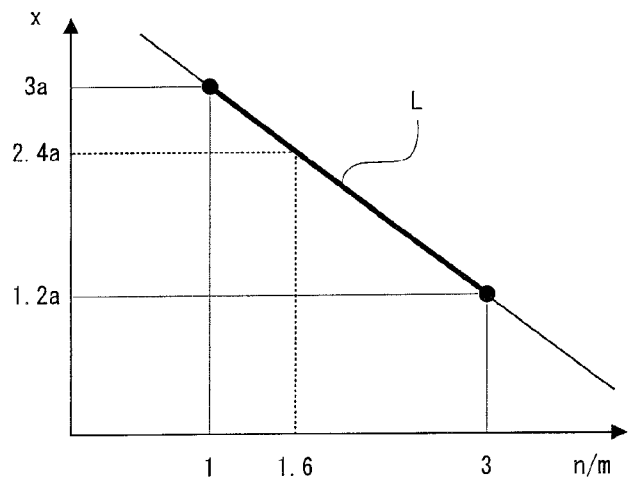
FIG. 10 is an illustrative view showing an interpolation curve applied to FIG. 1 embodiment.

Specifically, when $n/m \geq 3$, x=1.2a, and when n/m=1, x=3a. At the section between "1" and "3", a value corresponding to n/m is obtained from the interpolation curve L along the two end points, and the obtained resultant, that is, the interpolation value is regarded as an upper limit x. One example of the interpolation curve L is shown in FIG. 10. The interpolation curve L is a straight line passing through the two points (1, 3a) and (3, 1.2a), but an arbitrary curve (including a straight line) along the two points can also be used. By such interpolation processing, it is possible to reduce a sharp change in the amount of the exposure.

The CPU 28 performs correction processing on the data of the luminance evaluation area R1 such that each of the luminance evaluated values of 256 is restricted to be equal to or less than the upper limit x, and writes the resultant to the luminance correction area R4. Thus, each of the luminance evaluated values being above the upper limit x out of the luminance evaluated values of 256 is replaced with the upper limit x.

The succeeding exposure adjusting processing is based on the data of the luminance correction area R4. That is, the CPU 28 calculates an optimal exposure time on the basis of all or a part of the luminance evaluated values of 256 within the luminance correction area R4, and sets the resultant to the driver 32. As a result of the above-described correction processing, the upper limit of the luminance evaluated values is suppressed, and therefore, a shortage of the exposure can be resolved in a state that high luminance area is dispersed over the object scene (hereinafter, referred to as "dispersed backlighted state") like a shooting sunshine filtering through foliage.

More specifically, in shooting sunshine filtering through foliage, the width of the adjacent area included in the object scene is normally above the width of the high luminance area, and may reach three times as large as the width of the high luminance area. The data in FIG. 5(A) is obtained from a shooting sunshine filtering through foliage as one example of the dispersed backlighted state, and includes high luminance blocks of 50 (m=50). The number of adjacent blocks n here is calculated as 82 from the data in FIG. 5(B). Thus, n/m=82/50≈1.6, and a corresponding upper limit x is calculated as "2.4a" from the interpolation curve L shown in FIG. 10. Accordingly, the luminance evaluated value is corrected such that its upper limit is equal to or less than 2.4 times of the average value.

By thus reducing the luminance evaluated values, in the exposure adjusting processing, the amount of the exposure is eventually adjusted in a direction of increase. Specifically, the upper limit of the luminance evaluated value shall be a value obtained by multiplying a coefficient by the average value, and the coefficient is decreased as n/m increases, and whereby, it is possible to shoot at an appropriate amount of the exposure corresponding to the degree of dispersion of the high luminance area.

On the other hand, at a high luminance area localizing state (hereinafter, referred to as a "localized backlighted state"), such as a case that a bright window positions at the end of the object scene in shooting indoors, the width of the adjacent area is normally below that of the high luminance area. The data in FIG. 4(A) is obtained in such a localized backlighted state, and includes high luminance blocks of 50 as with the case of FIG. 5(A). On the other hand, the number of adjacent blocks n is calculated as 30 from the data in FIG. 4(B), therefore, n/m=30/50=0.6. Since this is below "1", the correction processing based on the n/m is not executed. Thus, it is possible to prevent correction processing from being executed when a backlight correction is not required, such as shooting a landscape including the sky with a high luminance, etc.

In the localized backlighted state, conventional correction processing based on the difference in luminance between a center portion and a periphery portion is alternatively executed. Thus, the light exposure is adjusted in the increasing direction, capable of realizing an appropriate exposure in the localized backlighted state.

When the shutter button 30 is full-depressed after completion of the exposure adjustment, the CPU 28 executes main imaging processing. In the main imaging processing, the optimal exposure time as a result of the exposure adjustment is first set to the driver 32. Then, the driver 32 is instructed to perform a primary exposure and read all the electric charges thus generated. The image sensor 12 is subjected to a primary exposure according to the optimal exposure time, and outputs all the electric charges thus generated, that is, a high-resolution raw image signal. The output raw image signal is converted into raw image data by the CDS/AGC/AD circuit 14, and the raw image data is converted into image data in a YUV format by the signal processing circuit 16. The converted raw image data is written to the SDRAM 20 through the memory control circuit 18.

The CPU 28 instructs a JPEG codec 34 to perform compression processing on the image data stored in the SDRAM 20. The JPEG codec 34 reads the image data from the SDRAM 20 through the memory control circuit 18, and performs a JPEG compression on the read image data. The compressed image data thus generated is written to the SDRAM 20 through the memory control circuit 18. After completion of the JPEG compression, the CPU 28 reads the compressed image data from the SDRAM 20 through the memory control circuit 18, and records an image file including the read compressed image data in a recording medium 38 through an I/F 36.

Figure 6:
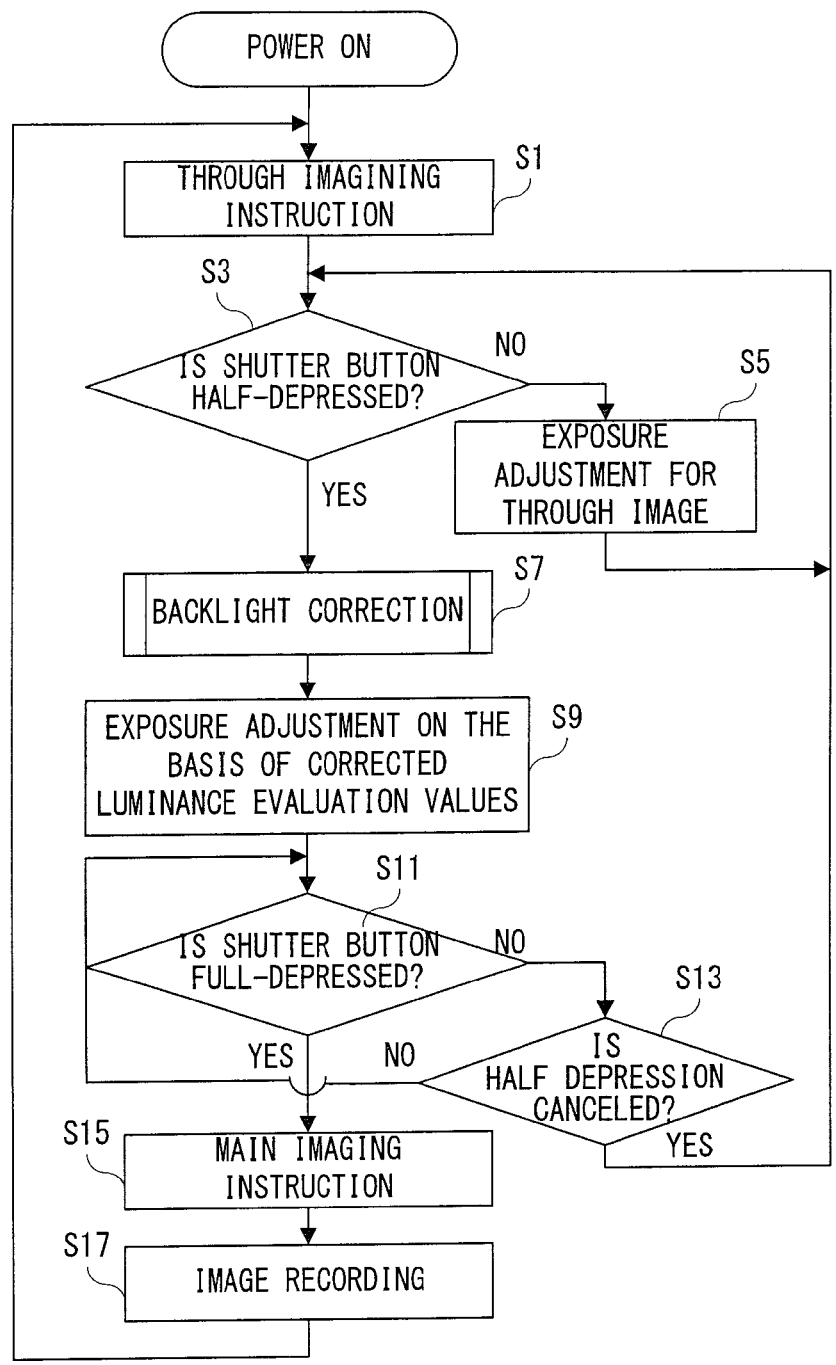
FIG. 6 is a flowchart showing a part of an operation of a CPU applied to FIG. 1 embodiment.

An operation of the CPU 28 described above is according to flowcharts shown in FIG. 6-FIG. 9. It should be noted that the programs corresponding to these flowcharts are stored in the flash memory 40. First, with reference to FIG. 6, when a power source is turned on, a through imaging instruction is issued in a step S1. In response thereto, following through imaging processing is performed.

The driver 32 repetitively executes a pre-exposure of the image sensor 12 and a thinning-out reading of the raw image signal, so that the image sensor 12 outputs a low-resolution raw image signal. The output raw image signal is subjected to a series of processing such as an A/D conversion by the CDS/AGC/AD circuit 14, so that raw image data thus generated is obtained. The signal processing circuit 16 performs processing such as a YUV conversion, etc. on the raw image data to generate image data in a YUV format. The generated image data is read after being written to the SDRAM 20 by the memory control circuit 18 and applied to the LCD driver 22. The LCD driver 22 drives the LCD monitor 24 according to the applied image data to thereby display a through-image of the object on the monitor screen.

The Y data out of the image data generated by the signal processing circuit 16 is applied to the luminance evaluation circuit 26. The luminance evaluation circuit 26 performs summation of Y data as to each of the divided areas of 256, so that luminance evaluated values of 256 are output from the luminance evaluation circuit 26.

In a succeeding step S3, it is determined whether or not the shutter button 30 is half-depressed. If the determination result is negative (NO), an exposure adjustment for a through image is performed in a step S5. More specifically, a part of the luminance evaluated values of 256 output from the luminance evaluation circuit 26 are added to each other to evaluate a luminance evaluated value for through-image. Then, the pre-exposure time set to the driver 32 is adjusted on the basis of the luminance evaluated value. Then, the process returns to the step S3.

If the determination result in the step S3 is affirmative (YES), the process shifts to a step S7 to perform a backlight correction (see FIG. 7: described later). In a succeeding step S9, an exposure adjustment on the basis of the luminance evaluated value after correction is performed, and the obtained optimal exposure time is set to the driver 32.

Then, the process enters a loop from steps S11 to S13 to wait for the shutter button 30 which is half-depressed being full-depressed or being cancelled. When the half depression of the shutter button 30 is released, "YES" is determined in a step S13, and the process returns to the step S3. When the shutter button 30 is full-depressed, "YES" is determined in a step S11, and the process shifts to a step S15 to issue a main imaging instruction.

In response to the main imaging instruction, the driver 32 performs a primary exposure according to the set optimal exposure time and reading of all the electric charges generated by the primary exposure. The image sensor 12 is subjected to a primary exposure according to the optimal exposure time, and outputs all the electric charges thus generated, that is, a high-resolution raw image signal from the image sensor 12. The output raw image signal is converted into raw image data by the CDS/AGC/AD circuit 14, and the raw image data is converted into image data in a YUV format by the signal processing circuit 16. The converted raw image data is written to the SDRAM 20 through the memory control circuit 18.

In a next step S17, an image recording is performed. Specifically, the JPEG codec 34 is first instructed to perform a compression processing on the image data stored in the SDRAM 20. The JPEG codec 34 reads the image data from the SDRAM 20 through the memory control circuit 18, and performs a JPEG compression on the read image data. The compressed image data thus generated is written to the SDRAM 20 through the memory control circuit 18. After completion of the JPEG compression, the compressed image data is read from the SDRAM 20 through the memory control circuit 18, and an image file including the read compressed image data is recorded in the recording medium 38 through the I/F 36. Then, the process returns to the step S1.

Figure 7:
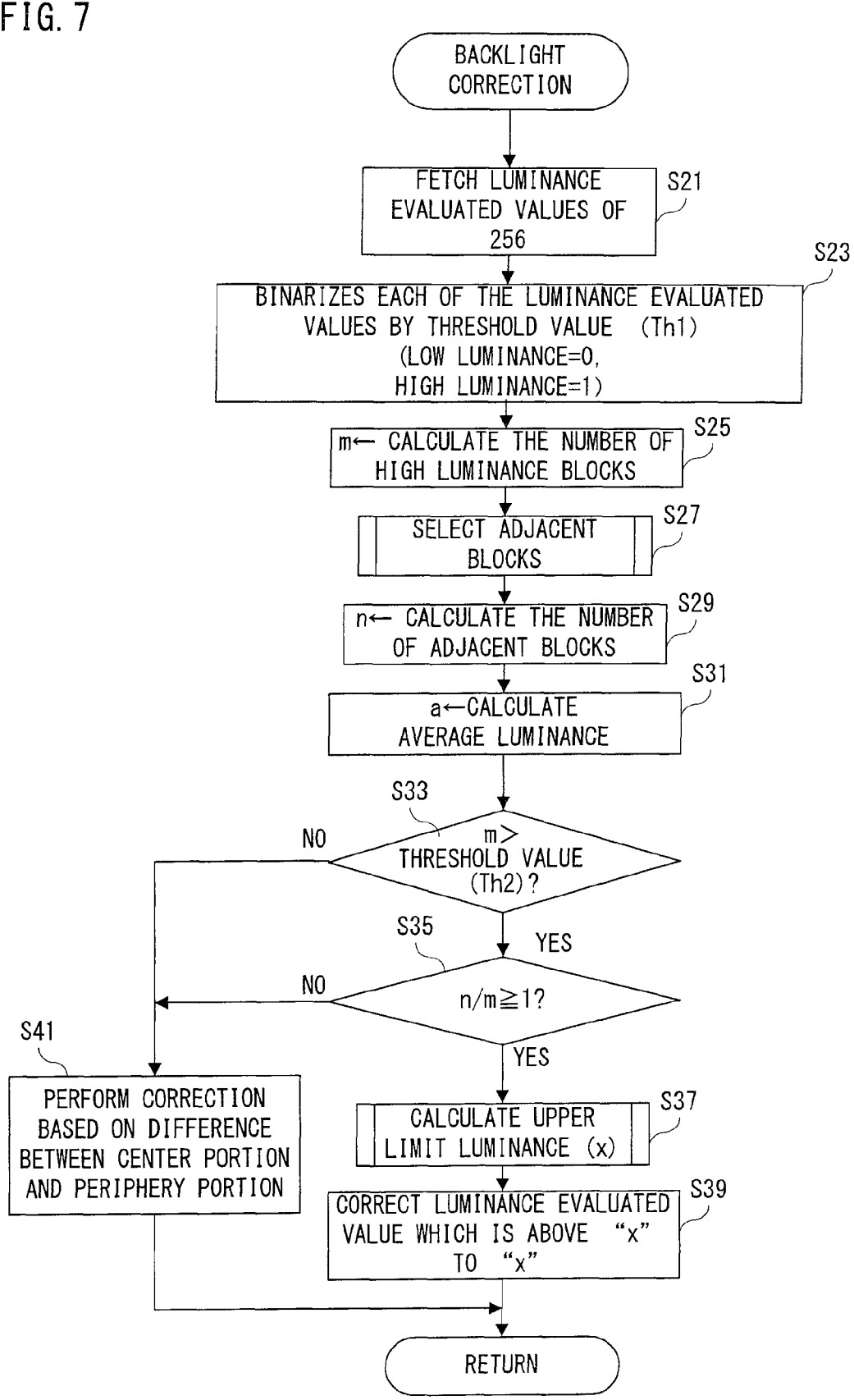
FIG. 7 is a flowchart showing another part of the operation of the CPU applied to FIG. 1 embodiment.

The backlight correction processing in the above-described step S7 is according to a subroutine shown in FIG. 7. Referring to FIG. 7, in a first step S21, luminance evaluated values of 256 are fetched from the luminance evaluation circuit 26 to the luminance evaluation area R1 (see FIG. 3). In a next step S23, the data of the luminance evaluation area R1, that is, each of the luminance evaluated values of 256 is binarized, and the resultant is written to the binarization area R2 (see FIG. 4(A), FIG. 5(A)). Then, in a step S25, the number of high luminance blocks is calculated on the basis of the data in the binarization area R2, and the resultant is set to a variable m.

In a succeeding step S27, an adjacent area is selected (see FIG. 8: described later) out of the divided areas of 256 on the basis of the data in the binarization area R2, and the resultant is written to the adjacent block selection area R3 (see FIG. 4(B), FIG. 5(B)). Then, in a step S29, the number of adjacent blocks is calculated on the basis of the data in the adjacent block selection area R3, and the resultant is set to a variable n.

In a next step S31, an average luminance value is calculated on the basis of the data in the luminance evaluation area R1, and the resultant is set to a variable a. Then, in a step S33, it is determined whether or not the variable m is larger than a threshold value (Th2), and if "NO", the process proceeds to a step S41. If "YES" in the step S33, it is determined whether or not n/m is more than 1 in a step S35, and if "NO", the process proceeds to the step S41. If "YES" in the step S35, an upper limit luminance (x) is calculated in a step S37 (see FIG. 9: described later).

In a succeeding step S39, correction processing based on the upper limit luminance calculated in the step S37, specifically, correction processing of equalizing luminance evaluated values above the value of the variable x out of the luminance evaluated values of 256 to the value of the variable x is performed on the data in the luminance evaluation area R1, and the resultant is written to the luminance correction area R4. Then, the process is restored to the hierarchical upper level of the routine.

In a step S41, correction processing based on the difference in luminance between the center portion and the periphery portion is executed. The correction processing is according to a following procedure, for example. The divided areas of 256 shown in FIG. 2 are divided into a center portion and a periphery portion, and an average luminance is evaluated as to each of the center portion and the periphery portion. When the average luminance at the center portion is significantly lower than the average luminance at the periphery portion, the luminance evaluated values at the periphery portion are suppressed. Thus, in the exposure adjusting processing in the step S9, the light exposure is adjusted in the increasing direction, so that an optimal exposure time in a state that the high luminance areas is locally present is set to the driver 32.

Figure 8:
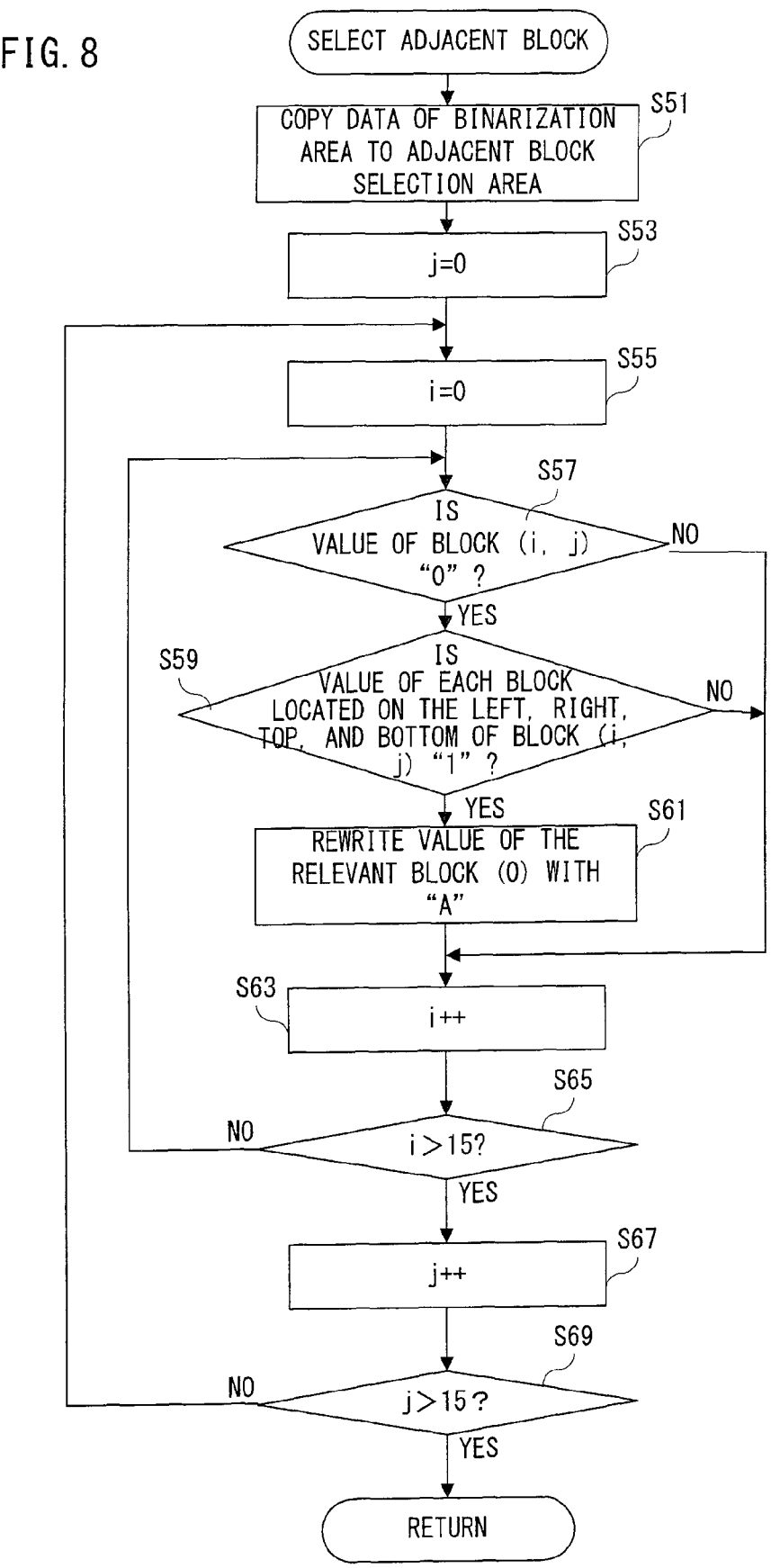
FIG. 8 is a flowchart showing a still another part of the operation of the CPU applied to FIG. 1 embodiment.

The adjacent block calculating processing in the aforementioned step S27 is according to the flowchart shown in FIG. 8. Referring to FIG. 8, in a step S51, the data in the binarization area R2 is first copied in the adjacent block selection area R3. The blocks of 256 stored in the adjacent block selection area R3 are identified with a pair of variables (i, j) (see FIG. 2).

Next, in a step S53, "0" is set to the variable j, and in a step S55, "0" is set to the variable i. Then, the process shifts to a step S57 to determine whether or not the value of the block (i, j) are "0", and if "NO", the process proceeds to a step S63. If "YES" in the step S57, the process shifts to a step S59 to determine whether or not the value of each blocks located on the left, right, top and bottom of the block (i, j) is "1", and if "NO" here, the process proceeds to the step S63. If "YES" in the step S59, the process shifts to a step S61 to rewrite the value of the block "0" with "A", then, the process shifts to the step S63.

In the step S63, the variable i is incremented. Then, the process shifts to a step S65 to determine whether or not the variable i is above "15", and if "NO", the process returns to the step S57. If "YES" in the step S65, the variable j is incremented in a step S67, and it is determined whether or not the variable i is above "15" in a next step S69. If "NO" here, the process returns to the step S55 while if "YES", the process is restored to the hierarchical upper level of the routine.

Figure 9:
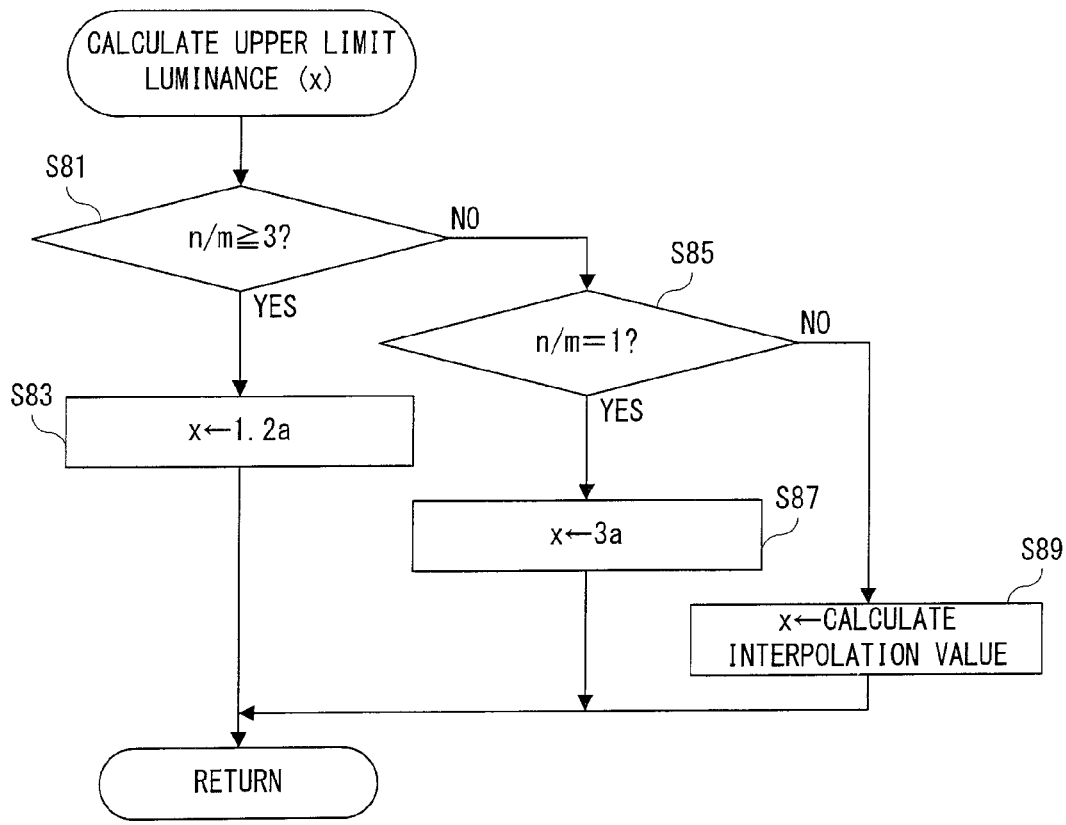
FIG. 9 is a flowchart showing a further part of the operation of the CPU applied to FIG. 1 embodiment.

The upper limit luminance (x) calculating processing in the above-described step S37 is according to the flowchart shown in FIG. 9. Referring to FIG. 9, in a step S81, it is determined whether or not n/m is equal to or more than "3", and if "YES", the process shifts to a step S83 to set "1.2a" to the variable x indicating the upper limit luminance. If "NO" in the step S81, the process shifts to a step S85 to further determine whether or not n/m is "1".

If "YES" in the step S85, the process shifts to a step S87 to set "3 a" to the variable x. If "NO" in the step S85, the process shifts to a step S89 to calculate an interpolation value on the basis of the interpolation curve L (see FIG. 10), and set the resultant to the variable x.

For example, when the object scene represents the luminance distribution as shown in FIG. 5(A) at the backlighted state like shooting a sunshine filtering through foliage, the n/m is calculated as "1.6". Thus, the interpolation processing in the step S89 is executed, and "2.4a" is set to the variable x.

When a value is set to the variable x in any one of the steps S83, S85 and S89, the process is restored to the hierarchical upper level of the routine.

It should be noted that the various numerical values described above, such as the value of n/m, the coefficient to be multiplied by the average luminance value a, etc. are only one example, and can be arbitrarily changed.

As can be understood from the above description, in the digital camera 10 of this embodiment, metering areas of 256 (see FIG. 2) are applied to the object scene captured by the image sensor 12 through the luminance evaluation circuit 26. The CPU 28 evaluates the luminance of the object scene for each metering area (S21), and binarizes each of the luminance evaluated values of 256 obtained by the evaluation processing into "1" representative of a high luminance higher than the threshold value Th1 and "0" representative of a low luminance lower than the threshold value Th1 (S23).

Subsequently, the CPU 28 calculates the width of a high luminance area included in the object scene on the basis of the binarized luminance evaluated values of 256 (S25). Furthermore, on the basis of the luminance evaluated values of 256, the width of an adjacent area adjacent to the high luminance area out of the low luminance area are included in the object scene is calculated (S27, S29). Then, each of the luminance evaluated values of 256 obtained by the evaluation processing is corrected on the basis of a ratio between the calculated width of the adjacent area and the calculated width of the high luminance area (S35-S39).

The CPU 28 adjusts an amount of the exposure on the image sensor 12 on the basis of the luminance evaluated values thus corrected (S9). This makes it possible to make up for the shortage of the amount of the exposure at the dispersed backlighted state, capable of shooting a sunshine filtering through foliage, etc. at a preferable amount of the exposure.

In this embodiment, on the basis of the ratio between the width of the adjacent area and the width of the high luminance area, a correction is made, but even if a correction is made on the basis of the difference between the width of the adjacent area and the width of the high luminance area, a predetermined advantage can also be obtained. In general, the shortage of the exposure can be compensated by performing a correction based on a relationship between the width of the adjacent area and the width of the high luminance area.

Furthermore, the adjacent area of this embodiment is an adjacent area being adjacent to the high luminance areas out of the low luminance areas included in the object scene. Alternatively, an area being adjacent to the low luminance area out of the high luminance area included in the object scene may be regarded as an adjacent area. In short, the area along the border between the high luminance area and the low luminance area may be regarded as an adjacent area.

In general, a size of the border between the high luminance area and the low luminance area (a width of the boarder area, a length of the boundary line, etc., for example) is evaluated, and by performing a correction on the basis of this, it is possible to reduce the shortage of the exposure at the dispersed backlighted state. In this case, a series of adjacent blocks shown in FIG. 4(B) and FIG. 5(B) may be regarded as a border area or a boundary line.

Figure 11:
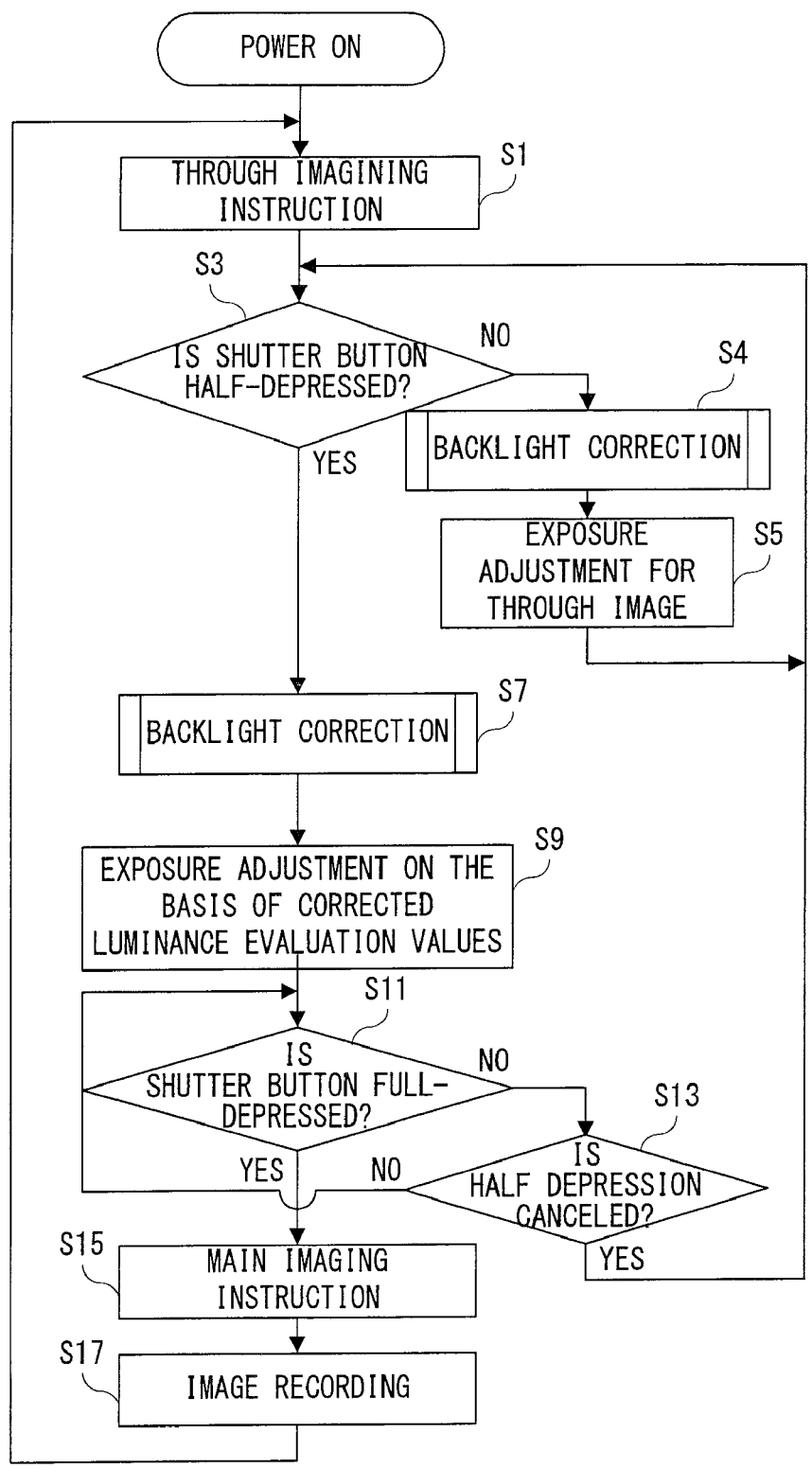
FIG. 11 is a flowchart showing a part of an operation of a CPU applied to another embodiment.

Furthermore, such a correction is effective at a moving image shooting and at a through image shooting without being restricted to at a still image shooting. A flowchart in a case that a correction is performed at a through image shooting and a still image shooting (main shooting) is shown in FIG. 11. The flowchart in FIG. 11 is obtained by adding a step S4 between the steps S3 and S5 in the flowchart shown in FIG. 6, and in the step S4, a backlight correction similar to that in the step S7 is performed. Accordingly, through the through image shooting during which the loop processing in the steps S3-S5 is executed, the data of the memory for luminance evaluation R is periodically updated, so that a shortage of brightness of the through-image at this dispersed backlighted state is also cancelled.

The above description is made by utilizing a digital camera 10, but the present invention can be applied to a film camera electronically controlling an amount of the exposure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera, comprising:
    an imager which captures an object scene;
    an assigner which assigns a plurality of metering areas to said object scene;
    an evaluator which evaluates a luminance of said object scene for each metering area;
    a classifier which classifies said plurality of metering areas into a high luminance area representing a luminance higher than a first threshold value and a low luminance area representing a luminance lower than said first threshold value on the basis of a plurality of luminance evaluated values obtained by the evaluation processing by said evaluator;
    a detector which detects a border between said high luminance area and said low luminance area which are included in said object scene on the basis of a positional relationship between said plurality of metering areas classified by said classifier;
    a corrector which corrects each of said plurality of luminance evaluated values obtained by the evaluation processing by said evaluator on the basis of a size of the border detected by said detector;
    an adjuster which adjusts an exposure amount on said imager on the basis of the luminance evaluated values corrected by said corrector;
    a first calculator which calculates a width of a border area along the border detected by said detector; and
    a second calculator which calculates a width of said high luminance area included in said object scene on the basis of said plurality of metering areas classified by said classifier, wherein
    said corrector performs a correction on the basis of the width of said border area calculated by said first calculator,
    said first calculator calculates a width of an adjacent area adjacent to said high luminance area included in said object scene as the width of said border area out of said low luminance area, and
    said corrector performs a correction by noting a relationship between the width of said adjacent area calculated by said first calculator and the width of said high luminance area calculated by said second calculator.

2. A camera according to claim 1, wherein
    said corrector notes a ratio between the width of said adjacent area and the width of said high luminance area.

3. A camera according to claim 1, wherein
    said corrector includes a reducer which reduces the luminance evaluated values above an upper limit out of said plurality of luminance evaluated values obtained by the evaluation processing by said evaluator to said upper limit or approximately said upper limit.

4. A camera according to claim 3, wherein
    said corrector further includes an adjuster which adjusts said upper limit so as to take a value according to a ratio between the width of said adjacent area and the width of said high luminance area.

5. A camera according to claim 4, further comprising
    a third calculator which calculates an average luminance value of said object scene on the basis of said plurality of luminance evaluated values obtained by the evaluation processing by said evaluator, wherein
    said adjuster includes a multiplier which multiples the average luminance value calculated by said third calculator by a coefficient changing in correspondence with a ratio between the width of said adjacent area and the width of said high luminance area.

6. A camera according to claim 1, further comprising
    a disabler which disables said corrector when the width of the high luminance area calculated by said second calculator is below a second threshold value.

* * * * *